Figure 1:
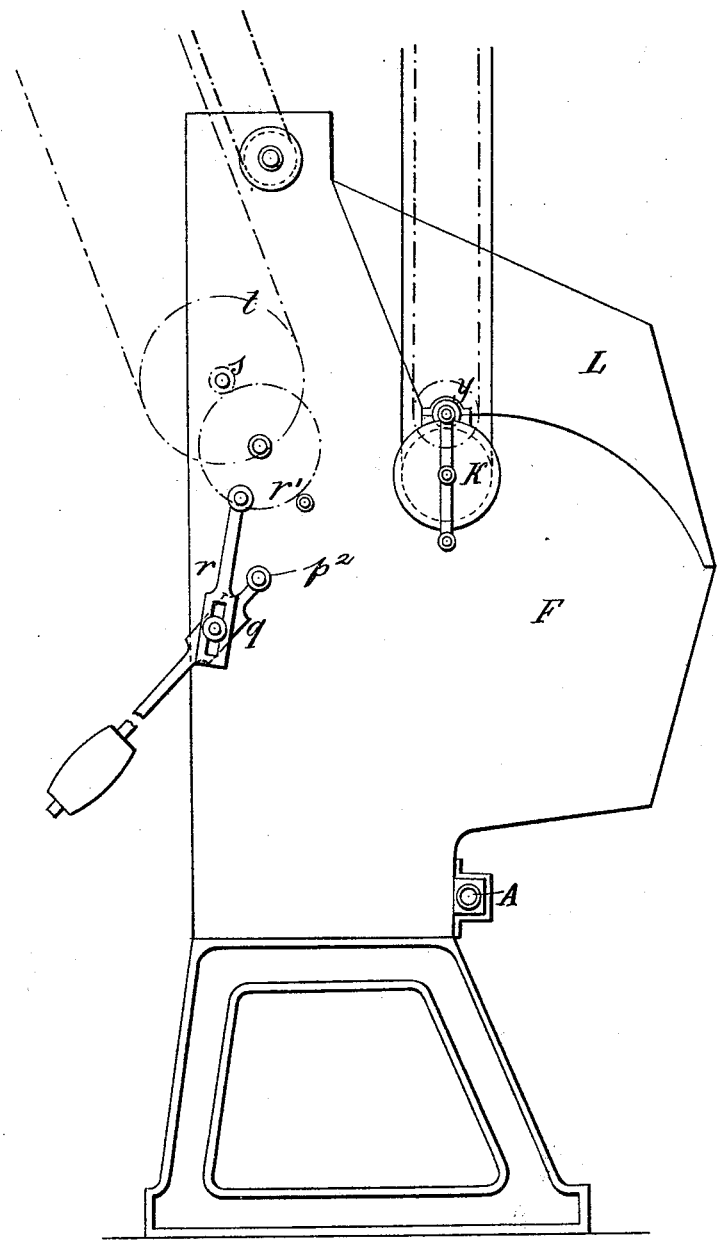

(No Model.) 6 Sheets—Sheet 1.
H. DE CHARDONNET.
APPARATUS FOR MAKING ARTIFICIAL SILK.

No. 460,629. Patented Oct. 6, 1891.

Witnesses
John Becker
Fred White

Inventor
Hilaire de Chardonnet,
By his Attorneys, (No Model.) 6 Sheets—Sheet 2.
H. DE CHARDONNET.
APPARATUS FOR MAKING ARTIFICIAL SILK.

No. 460,629. Patented Oct. 6, 1891.

Witnesses
John Becker
Fred White.

Inventor
Hilaire de Chardonnet.
By his Attorneys,
Arthur C. Fraser & Co.

(No Model.) 6 Sheets—Sheet 3.
H. DE CHARDONNET.
APPARATUS FOR MAKING ARTIFICIAL SILK.

No. 460,629. Patented Oct. 6, 1891.

Witnesses
John Becker
Fred White

Inventor
Hilaire de Chardonnet,
By his Attorneys,
Arthur C. Fraser & Co.

(No Model.)  6 Sheets—Sheet 4.
H. DE CHARDONNET.
APPARATUS FOR MAKING ARTIFICIAL SILK.

No. 460,629.  Patented Oct. 6, 1891.

Witnesses
John Becker
Fred White

Inventor
Hilaire de Chardonnet,
By his Attorneys,
Arthur C. Fraser & Co.

(No Model.)  6 Sheets—Sheet 5.
H. DE CHARDONNET.
APPARATUS FOR MAKING ARTIFICIAL SILK.
No. 460,629.  Patented Oct. 6, 1891.
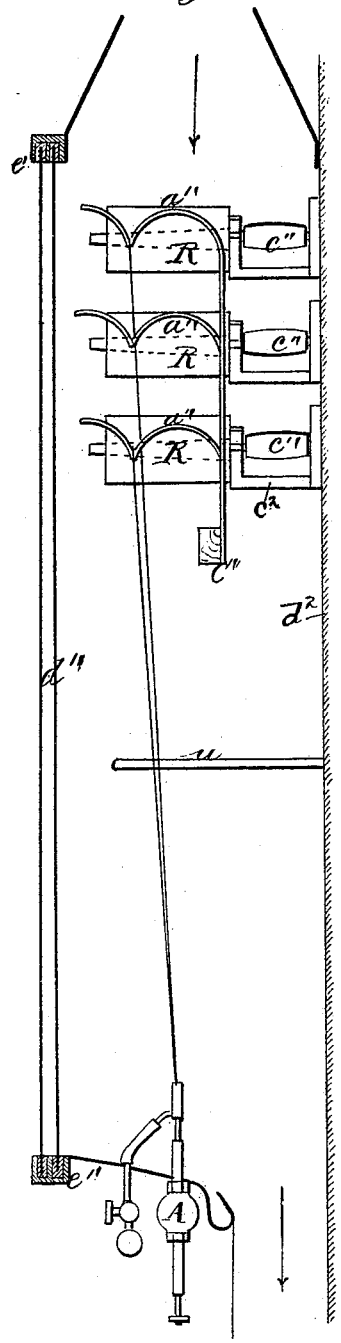
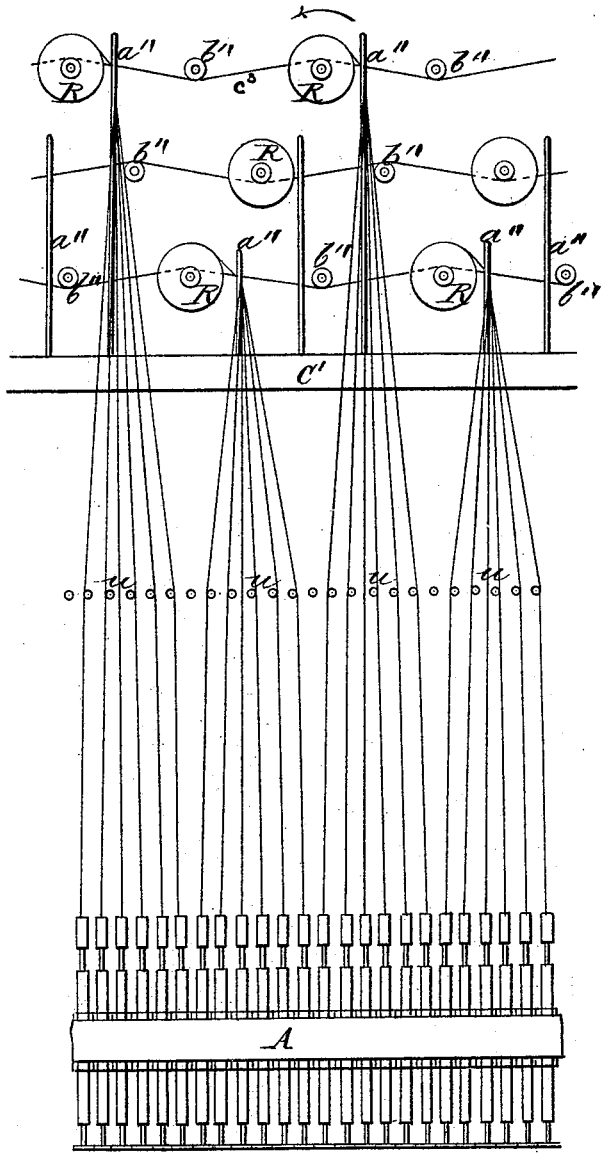
Witnesses
John Becker
Fred White
Inventor
Hilaire de Chardonnet,
By his Attorneys,
Arthur C. Fraser & Co.

(No Model.) 6 Sheets—Sheet 6.
H. DE CHARDONNET.
APPARATUS FOR MAKING ARTIFICIAL SILK.
No. 460,629. Patented Oct. 6, 1891.
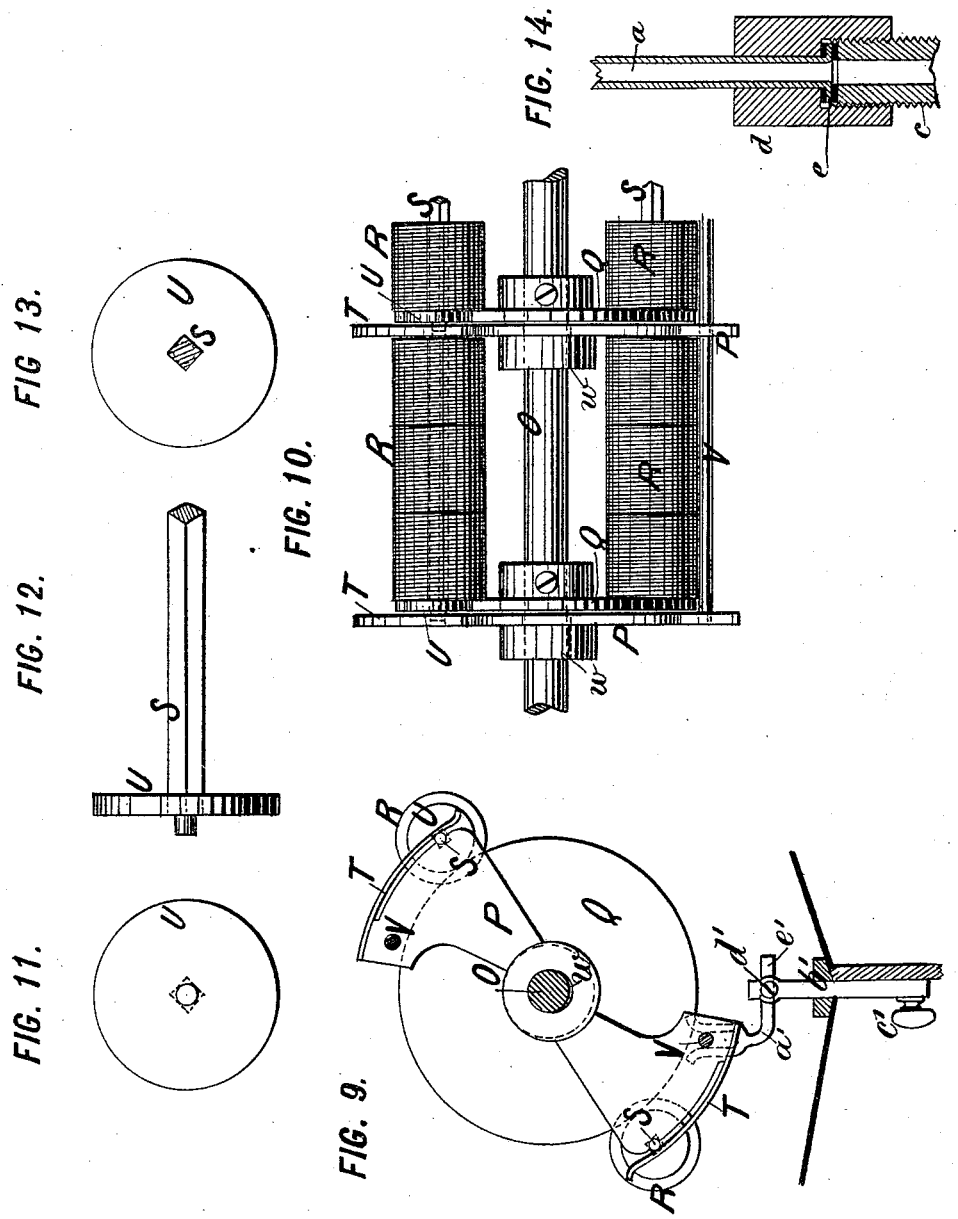
WITNESSES:
John Becker
Fred White
INVENTOR:
Hilaire de Chardonnet,
By his Attorneys
Arthur C. Fraser & Co.

UNITED STATES PATENT OFFICE.

HILAIRE DE CHARDONNET, OF BESANÇON, FRANCE.

APPARATUS FOR MAKING ARTIFICIAL SILK.

SPECIFICATION forming part of Letters Patent No. 460,629, dated October 6, 1891.

Application filed April 26, 1890. Serial No. 349,871. (No model.) Patented in France July 10, 1889, No. 199,494.

*To all whom it may concern:*

Be it known that I, HILAIRE DE CHARDONNET, a citizen of the Republic of France, residing in Besançon, Doubs, France, have invented certain new and useful Improvements in Apparatus for Making Artificial Silk, of which the following is a specification.

The present invention, which is the subject of French Patent No. 199,494, dated July 10, 1889, contains improvements in a machine for the filature or spinning of collodion or other liquids for the manufacture of artificial silk, described and claimed in my United States patent, No. 394,559, dated December 18, 1888.

In my previous patent I described the process which I had invented for making artificial silk. Experiments which I have made led me to certain improvements in this manufacture relating chiefly to the spinning-machine. In the present application for a patent I shall describe the whole of my process and apparatus for this manufacture with the improvements which I have lately made.

Artificial silk consists, essentially, of dissolved nitrated cellulose. This solution, projected into another liquid which coagulates it, immediately takes the form of a thread, which can be reeled and treated like that of a cocoon. In order to reduce the combustibility of this material, part of its nitric acid is removed by suitable means, and it may be made at the same time to absorb saline and coloring matters. Cellulose purified is obtained from the chemical pulps of wood, straw, cotton, rags, filter papers, hemp, ramie, &c. It is nitrated by the known processes, so as to render it soluble in a mixture of alcohol and ether. A collodion more or less concentrated is formed by dissolving the pyroxyline in a mixture of forty parts ether with sixty parts alcohol, by volume. The pyroxyline is first dissolved in equal parts of alcohol and ether and the excess of alcohol is afterward added. This solution, well filtered, is introduced into a liquid-spinning machine of the following description.

Figure 2:
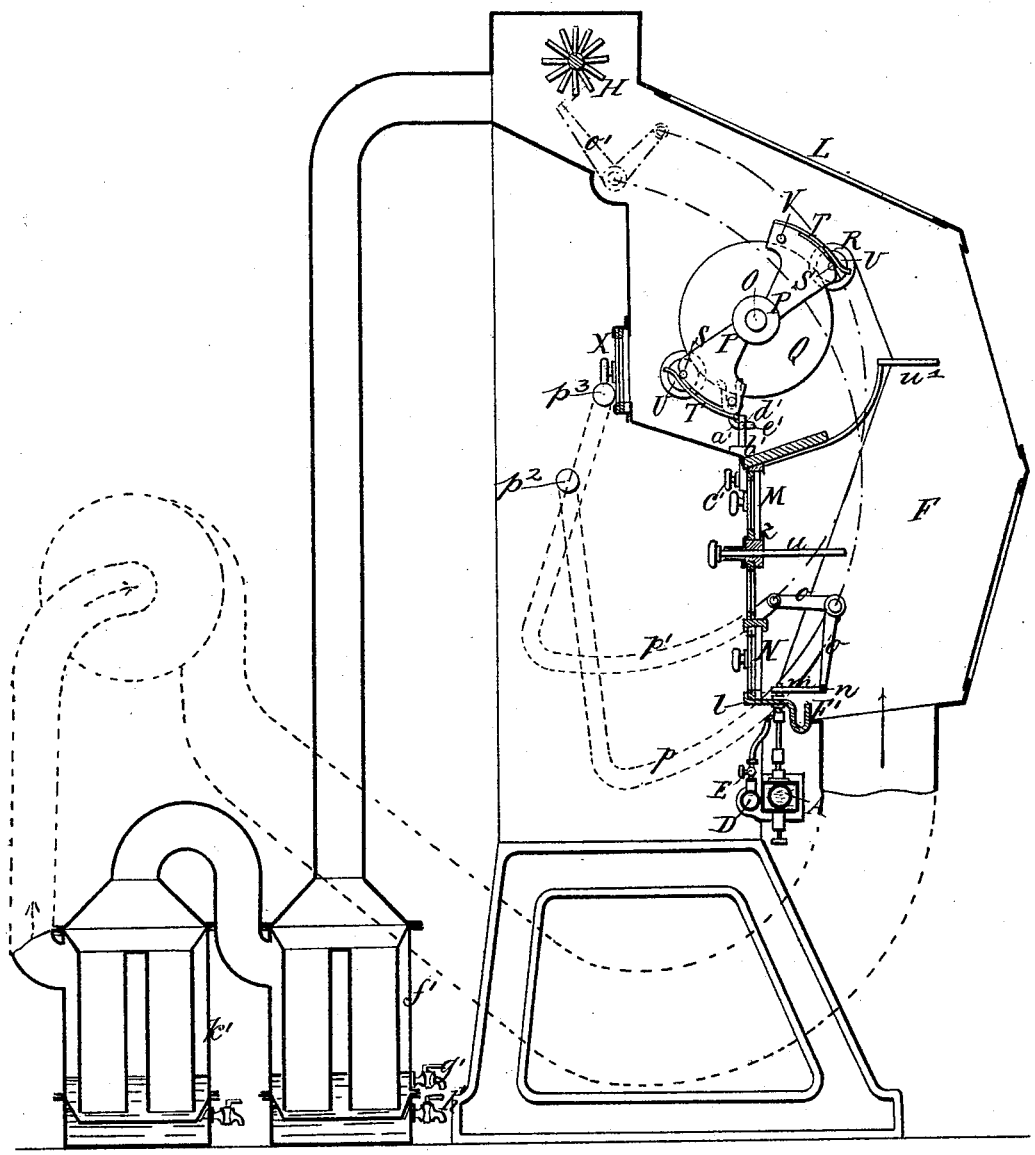
Figure 3:
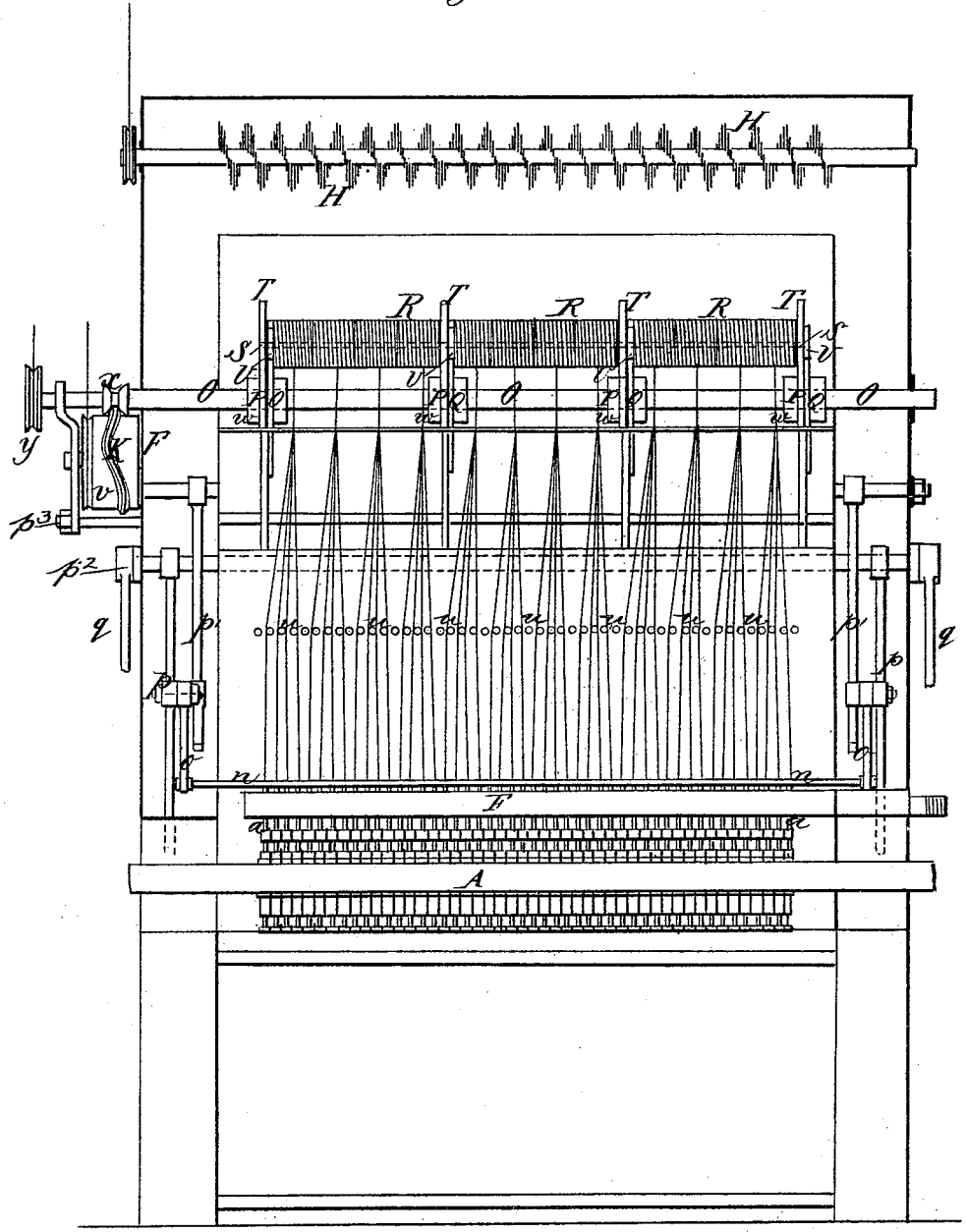
Figure 4:
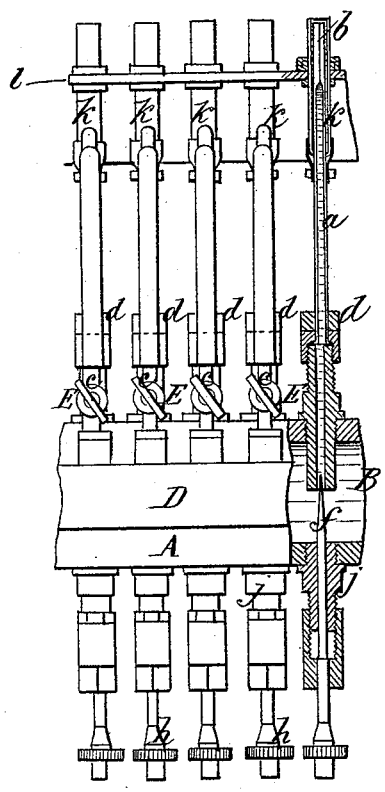
Figure 5:
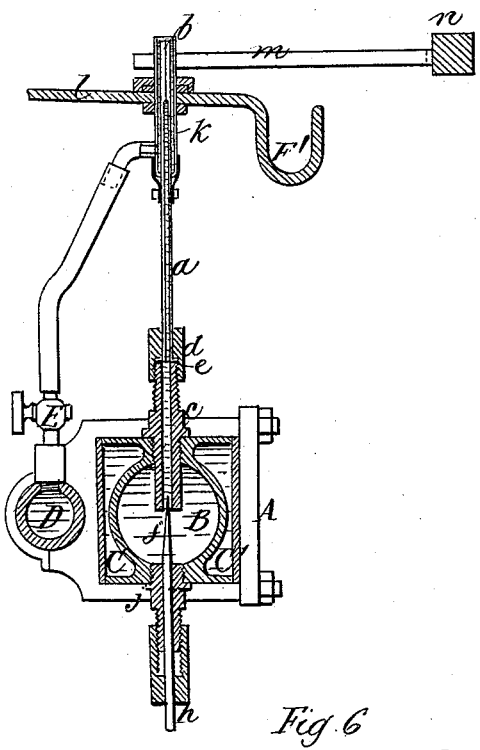
Figure 6:
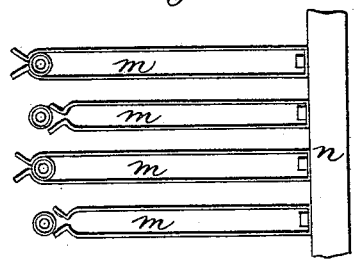

Figure 1 of the accompanying drawings is a side elevation, Fig. 2 is a transverse section, and Fig. 3 a front view, of my improved machine for spinning liquid to obtain artificial silk. Fig. 4 is a rear elevation, on a larger scale, of a portion of the series of spinning-dies, one of them being shown in section. Fig. 5 is a vertical transverse section of the parts shown in Fig. 4, with the addition of the nippers $m$ and bar $n$. Fig. 6 is a plan of these nippers, showing their engagement with the spinning-dies. Fig. 7 is a vertical transverse section, and Fig. 8 a front elevation, of parts of another construction of machine. Fig. 9 is a fragmentary enlargement of a portion of Fig. 2. Fig. 10 is a similar enlargement of a fragment of Fig. 3, being a front elevation of the parts shown in Fig. 9. Fig. 11 is an end view of a spindle with its roller U. Fig. 12 is a side elevation thereof, and Fig. 13 a cross-section of the spindle. Fig. 14 is a fragmentary enlargement of a portion of Fig. 5, showing the parts $d$ and $e$ therein in detail.

The collodion solution well filtered is introduced into a closed vessel (not shown in the drawings) in which an air-pump maintains a pressure of from six to twelve atmospheres. This vessel, suitably lined inside, communicates through a stop-cock with the pipe A, which carries the spinning-dies, and extends the whole length of the machine, being arranged underneath the casing F, which incloses the spinning and reeling mechanism. The pipe A, as shown in detail to an enlarged scale by Figs. 4 and 5, has three internal compartments, the central one B, which holds the solution and forms a conduit for conducting it to the spinning-dies, and the two side compartments C and C' for circulating water around the central tube B. Each spinning-die consists of a tube $a$, on which is soldered a capillary tube $b$. The lower end of tube $a$ communicates with the sleeve $c$ screwed into the pipe A, the mouth of which sleeve opens into the conduit B. A screw-union $d$ holds the die-tube to the sleeve, making a tight joint by two washers of leather or the like pressing between them the lip $e$ at the lower end of the tube $a$, as best shown in Fig. 14, and constituting thus a detachable coupling for uniting the die $a$ to the supply tube or sleeve $c$. The outflow of the liquid from the conduit B into each of the die-tubes is regulated by the conical end $f$ of a screw-pin or rod $h$, which enters the lower end of the sleeve $c$, and by means of an adjusting-head beneath can be screwed more or less through the stuffing-box *j* on the under side of the pipe A, so as to diminish or increase the area of the passage through which the liquid flows into the die-tube. The valves thus constructed enable the flow to the separate dies to be regulated with great nicety, and in connection with the detachable couplings provide for the shutting off of the flow from any die that may become clogged, and its removal and replacement without interfering with the spinning from the remaining dies. These valves are made of metal or other material not acted on by the liquid, and their adjusting-heads project beneath the casing F, where they are readily accessible and within easy reach of the operator. Around the upper part of each die-tube is a casing *k*, supported by the fixed plate *l*, which extends along the machine. The casing *k* supplies cold water at the end of the die-tube, this water being supplied from a pipe D, which has a branch with stop-cock E to each of the casings *k*. These stop-cocks, which are made of metal, regulate the flow of cold water in which the filament is submerged as it issues from the die-tube *a*, instead of regulating this flow by the compression of a rubber tube, as formerly. The overflow-water runs into a gutter F', which extends along the machine at the edge of the transversely-inclined plate *l*.

When the machine is not in action, the pipes A and D for solution and water are stopped and the mouths of the spinning-dies are closed by drops of mineral oil, which prevents contact of air with the solution or the water.

For starting, it suffices to re-establish the pressure in the pipes A and D. The liquid stream of collodion becomes solidified by passing through the water and immediately forms a filament, which strays along the water, flowing around the casing *k*, whence the filaments are picked up by special nippers or pinching-fingers. (Shown in Figs. 2, 5, and 6.) Each nipper consists of two blades *m*, curved so as to embrace the casing and presenting sloping ends, which, sliding along the casing, open the blades apart. All the nippers *m* are carried by a bar *n*, each end of which is attached to an arm of a bell-crank *o*, jointed to two curved arms *p p'*, Fig. 2. These parts *o*, *p*, and *p'* are duplicated at the opposite ends of the casing. The two arms *p p* are fixed on a shaft $p^2$, and *p' p'* are fixed on a shaft $p^3$. One pair of these arms *p*, being caused to oscillate, carries the other pair with it through their connection by the arm *o*. The arms *p* are moved in the following manner: The shaft $p^2$ (or $p^3$) extends outside the case F and has fixed on its end a crank *q*, Fig. 1, vibrated by the link *r*, which is driven by a crank on the toothed wheel *r'*, geared to a pinion *s* on the shaft of the motor-pulley *t*. The shafts of the pinions *s* and wheels *r'* extend the whole length of the machine. Owing to the oscillation thus given to the arms *p p'* the two bell-cranks *o*, carrying the nippers, move from the position shown in full lines in Fig. 2 to that shown in dotted lines at *o'*. The paths of the ends of the arms *p p'* are shown by the dotted arcs. The nippers move in a path farther to the front, so that they avoid the guides and bobbins, and normally they do not touch the filaments.

On beginning work, the filaments having presented themselves above the casings *k*, the spring-blades as they rise seize the commencing filaments and raise them over the usual horizontal guides *u* and fork-guides *u'*, which gather them in groups to be carried over the bobbins R. The grouped filaments cohere together and form a row of several strands. Once the spinning has begun there is no discontinuity from the mouth of the die. The material which issues from the die goes on, being continuously wound on its bobbin. Should a filament break, the new end is seized by the nipper, as above described. At the upper extreme of their stroke the nippers come in contact with a revolving brush H, which cleans them. This brush consists of a cylinder in which are inserted edgewise blades *v*, which rake the nippers and remove such material as may adhere to them. The blades *v* are arranged helically. The nippers are long and short alternately, as shown in the plan, Fig. 6, so that they do not all at once act on the casings *k*, thus avoiding or at least lessening the shock of their opening. By their opening alternately the effort is more regular.

A current of air heated to about fifty degrees enters at the lower part of the casing F and rises at the top charged with ether and alcohol vapor. In order to recover the solvent, it is preferred to cause the warm air coming from the machine to pass slowly through three bubbling-vessels cooled by water-circulation, Fig. 2. The first of these *f'* contains a saturated aqueous solution of carbonate of potash. The water-vapor condenses dissolving a further quantity of carbonate. The alcohol and ether also partly condense, but being insoluble in the aqueous liquid they form on its surface a distinct layer which can be run out by a gage-cock *g'* according as the liquid accumulates. Another cock *h'* below serves to run out the water of condensation and to maintain the level of the carbonate solution. The dissolved carbonate may be recovered by evaporation and be used over and over again. Almost the whole of the alcohol and part of the ether remain in the first vessel. Simple digestion in contact with dry carbonate of potash, followed, if necessary, by distillation, restores the alcohol and ether to condition for subsequent operations. A considerable part of the ether is still carried off by the air. The second and third vessels, of which only one *k'* is shown, are charged with concentrated sulphuric acid which absorbs the ether and the residue of the alcohol. When the acid of the second vessel has absorbed about four times its volume of ether, it is drawn off and diluted with water, which separates about three-fourths of the condensed ether. A distillation separates the remaining one-fourth. This ether, after digestion over dry carbonate of potash, and, if necessary, distillation, is ready to serve again. The small residue of the alcohol may be recovered by distillation in the usual manner.

The air thus dried is sent back to the spinning-machines by a fan or blower which may be arranged and connected, substantially as shown in dotted lines in Fig. 2, although in practice it is connected to a third vessel beyond the vessel $k'$, instead of to the second vessel, as shown.

It is well to provide three of the sulphuric-acid bubbling-vessels, so that two can be in use. When the acid in the first is saturated, the air from the carbonate is sent into the second and third condensers while the first is being emptied and charged afresh. Thus the three can be worked in rotation.

In order that the successive convolutions of the filaments on the bobbins may not overlie each other, but cross angularly, the bobbins are moved to and fro horizontally. This motion is imparted from a cam K, which is a drum, Fig. 3, driven by a belt or otherwise, and having an undulating projecting rib $v$, so that as the cam revolves this rib engages the groove in a collar $x$ on the bobbin-shaft, which it thus moves endwise back and forth, while the bobbin-shaft is made to revolve by a grooved pulley $y$ driven from any suitable motor. The collar $x$ consists of two steel rollers having spherical approaching faces, which can be brought near enough to embrace the helicoidal rib, the latter being so shaped as in all positions to fill the space between the two rollers.

The filaments might be received on reels; but this would be inconvenient, as it would involve dismounting the reel-shaft in order to remove the hanks, which should be spirally reeled, as in ordinary silk-working. The properties of the artificial silk permit of this being done better than with natural silk and of receiving it on bobbins which are mounted on special checks, where they are retained by springs.

The continuously-rotating shaft O, having also a to-and-fro longitudinal motion, carries a series of checks P, fitted loose on the shaft, also disks Q. (See Figs. 9 and 10.) The bobbins R are threaded on spindles S, Fig. 12, kept on the checks P by blade-springs T, and each of the spindles S on which the bobbins revolve has a small roller U, which, being in contact with the corresponding disk Q, causes the spindle to rotate and the group of bobbins on it, the spindle having a square section. The checks P are all connected together by bars V, which allows the whole system to be turned in order to withdraw the filled bobbins and put empty bobbins in their places. The turning of the two systems at the same time may be avoided by giving the eyes $w$ of the checks P a little play, as shown in Fig. 9. The weight of the set causes the rollers U of the upper bobbins to bear on the disks Q, freeing the lower bobbins, which do not revolve.

In order to facilitate the removing and replacing of bobbins, I provide a series of wickets X of the casing for admitting the hand to the interior.

In order to keep the system in place during working, I arrange at each end a fork $a'$, Fig. 9, which embraces the end of the bar V, which is then lowest. This fork allows the to-and-fro movement of the system, but prevents it from turning around along with the shaft O. The forks $a'$ are on rods $b'$, which can be raised or lowered by acting on knobs $c'$ outside; and their position can be fixed by set-screws $d'$, which clamp the tail of the forks $a'$, so as to bring the upper bobbins into the position most suitable for the winding of the filaments.

The casing of the apparatus is provided with glass widows in both front and back, and has a cover L hinged to its upper part.

The water which moistens the spinning-dies becomes charged with alcohol and ether which should not be wasted. Consequently the same water is used over and over again, being raised by a pump.

On the side where the operator stands there are two rows of wickets M and N, giving access to clean the dies or the horizontal guides $u$, which are simply inserted in the partition $z$ and can be easily withdrawn outside or replaced. The valves for regulating the flow of collodion and water to the dies are arranged wholly exterior to the casing, only the die-tubes entering the latter, whereby the valves and passages are readily accessible for cleaning and repairs.

I have said that the filaments as they are discharged have a certain adhesion which permits of their being reeled together like ordinary silk-raws. If the adhesion is not found sufficient, adhesive matter, such as starch or dissolved gelatine, might be introduced into the water which moistens the dies; also, incombustible substances, such as phosphate of ammonia, might be introduced into the water which moistens the dies, but that would not suffice to overcome the excessive combustibility of the new textile material.

Once the silk is reeled, denitration is effected, as explained in my previous patent, No. 410,404, dated September 3, 1889.

The recovery of the solvent by means of carbonate of soda or potash and sulphuric acid would allow of simplification of the mechanism above described.

With good ventilation, which carries into the condensers all the air charged with vapors, the machine can be frequently and largely opened without danger, or it might even be worked quite open.

The mechanism might be reduced to the arrangements shown in Figs. 7 and 8.

The die-tubes extend free above the supply-pipe A, carrying themselves their water-casings.

The filaments after passing the comb of horizontal guides $u$ are put by hand over the guides $a''$ on the bobbins R. These bobbins, which are ordinary silk milling-pirns, are threaded on spindles of the usual kind, which are mounted horizontally and perpendicular to the wall of the factory and are caused to revolve by pulleys $c''$ on them within a small framing of cast-iron fixed against the wall, acted on by a friction-band $c^3$, as in ordinary milling-machines. The spindles and pirns revolve all in the same direction, and the frictional driving is insured by means of small tightening-rollers $b'$, similar to the pulleys $c''$, but without spindles.

The guides $a''$ are made of thick copper wires suitably bent and all fixed on a bearing-beam C', which has a horizontal to-and-fro motion imparted either from a cam K, such as is described above, or from any other suitable appliance employed in spinning-machinery.

The dry air warmed again comes from the condensers to the top and is drawn down charged with the heavy alcohol and ether vapors.

The front of the machinery may, if desired, be closed by the glass doors $d''$, sliding in grooves $e'$.

Two of the three pirns are in use at a time. As soon as one is filled the operator disconnects the bundle of filaments which has been winding onto it and transfers the bundle to the pirn which has been turning empty, and then removes the filled pirn and puts in its place an empty one ready for use in its turn. Thus the transfer is made without interrupting the spinning. The pirns hold merely by friction on the spindles, as in ordinary milling-machines.

I claim as my invention the following-defined novel features and combinations, each substantially as hereinbefore specified, namely:

1. In a machine for spinning filaments from a liquid, the combination of a series of spinning-dies, a conduit from which they branch and through which the liquid is conducted to them, valves for controlling the flow to the several dies, spinning mechanism for drawing out the filaments from the dies, and a casing inclosing such spinning mechanism and the delivery ends of the dies, but not inclosing the conduit nor the valves, whereby the latter are rendered accessible for operation, inspection, and repairs without opening the casing or interrupting the spinning operation.

2. In a machine for spinning filaments from a liquid, the combination of a series of spinning-dies, a conduit from which they branch and through which the liquid is conducted to them, valves for controlling the flow to the several dies, spinning mechanism for drawing out the filaments from the dies, water-tubes inclosing the ends of said dies, a water-conduit and branch pipes therefrom conducting water to said tubes, valves in said branch pipes, and a casing inclosing such spinning mechanism and the delivery ends of the dies and water-tubes, but not inclosing said conduit, valves, nor branch pipes, whereby the latter are rendered accessible for operation, inspection, and repairs without opening the casing or interrupting the spinning operation.

3. In a machine for spinning filaments from a liquid, the combination of a casing F, formed with a die-plate $l$, a series of spinning-dies projecting through said plate, a conduit exterior to the casing, having branch tubes communicating with the respective dies, and valves for controlling the flow of liquid from the conduit through the tubes to the dies, arranged exterior to said casing.

4. In a machine for spinning filaments from a liquid, the combination of a casing F, having a die-plate $l$ at its bottom communicating with a gutter F', a series of water-tubes passing through and fixed to said die-plate, a water-conduit having valved branch pipes connecting with the said water-tubes and exterior to said casing, a series of spinning-dies projecting from beneath through said water-tubes and terminating in communication with the interior of the casing, a conduit for feeding liquid to said dies, and valves for controlling the flow of liquid from said conduit to the dies arranged exterior to said casing.

5. The combination, with a row of spinning-dies and a conduit for leading collodion thereto, and a row of supply-tubes branching from said conduit and terminating at the respective dies, of a series of valves for controlling the flow of the collodion to said dies, consisting of rods entering the conduit on the opposite side from the supply-tubes, having adjusting-heads exterior to the conduit, and conical ends entering the passages from the conduit to the respective supply-tubes and constructed to screw more or less into said passages to regulate or cut off the flow to the individual dies.

6. In a machine for spinning filaments from a liquid by drawing the liquid from spinning-dies, means for holding the movable bobbins on which to coil the filaments issuing from the dies, consisting of a holder having notches for receiving the spindles of the bobbins, and blade-springs T T for holding the spindles in said notches, whereby they may be easily withdrawn and replaced by the operator.

7. The combination, with spinning-dies, of means for holding two or more series of removable bobbins on which to coil the filaments issuing from the dies, and a swinging frame for carrying the two series of bobbins adapted to be swung or vibrated to substitute empty for filled bobbins.

8. The combination, with spinning-dies, of two or more removable spindles for holding bobbins on which to coil the filaments issuing from the dies, a swinging frame carrying the spindles in different radial positions, whereby by turning the frame a spindle carrying an empty bobbin may be substituted for one carrying a filled bobbin, and an adjustable catch-piece for engaging said frame in either position.

9. In a machine for spinning filaments from a liquid by drawing the liquid from spinning-dies, the combination of means for holding the movable bobbins on which to coil the filaments issuing from the dies, rollers, or traction-surfaces in connection with the bobbins, and a revolving shaft carrying friction-wheels revolving in frictional contact with said rollers or traction-surfaces, whereby a rotative tendency is imparted to the bobbins.

10. The combination of spinning-dies, means for holding one or more bobbins on which to coil the filaments issuing from the dies, a shaft by which said bobbins are carried, and means for imparting longitudinal reciprocation to the shaft and thereby to the bobbins, consisting of a rotative cam having a sinuous rib, and collars or opposed shoulders on said shaft engaging said rib.

11. In a machine for spinning filaments from a liquid by drawing the liquid from spinning-dies, the combination of a continuously-rotating shaft O, a series of checks P, fitted loosely on said shaft, having spring-sockets for holding the bobbin-spindles, friction-disks in connection with said shaft and the bobbins, respectively, for rotating the bobbins, and means for holding the checks stationary on said shaft.

12. In a machine for spinning filaments from a liquid by drawing the liquid from spinning-dies, the combination of a shaft O, a bobbin-carrying frame consisting of checks P P, connected together and adapted to turn on said shaft and having opposite spring-sockets for engaging the spindles of two sets of bobbins, means for rotating the bobbins, and a stop movable at will to engage said frame and hold it stationary in either position while the corresponding set of bobbins is being filled.

13. The combination, with apparatus for spinning filaments from a liquid, of a casing inclosing said spinning apparatus, means for forcing air through said casing, and means for recovering from the air the solvent vapors suspended in it, consisting of bubbling-vessels containing, respectively, carbonate of potash and sulphuric acid cooled by water and arranged to be traversed by the air in its passage from the casing.

In witness whereof I have hereunto signed my name in the presence of two subscribing witnesses.

HILAIRE DE CHARDONNET.

Witnesses:
 R. J. PRESTON,
 AUGUSTE MATHIEU.